Dec. 21, 1926.

F. W. MEYER 1,611,277

ELECTROIONIC RELAY

Filed March 24, 1920 2 Sheets-Sheet 1

Inventor
Friedrich Wilhelm Meyer
Edwin B. H. Tower Jr. Atty.

Dec. 21, 1926.
F. W. MEYER
1,611,277
ELECTROIONIC RELAY
Filed March 24, 1920    2 Sheets-Sheet 2

Inventor
Friedrich Wilhelm Meyer
Edwin B. H. Tower Jr. Atty.

Patented Dec. 21, 1926.

1,611,277

UNITED STATES PATENT OFFICE.

FRIEDRICH WILHELM MEYER, OF MILWAUKEE, WISCONSIN, ASSIGNOR TO THE CUTLER-HAMMER MFG. CO., OF MILWAUKEE, WISCONSIN, A CORPORATION OF WISCONSIN.

ELECTROIONIC RELAY.

Application filed March 24, 1920. Serial No. 368,329.

This invention relates to electroionic relays.

It relates particularly to relays for amplifying alternating currents in their passage therethrough.

In order to obtain higher relay ratios than are usually available in a single relay, it has been the practice, ordinarily, to connect several relays in series or cascade. The ultimate relay effect is then the product of the relay effects of the several relays.

One of the objects of this invention is to provide an improved alternating current electroionic relay.

Another object is to provide a single relay for amplifying both half waves of an alternating current with the effect of a series or cascade of ordinary alternating current electroionic relays.

Another object is to provide an improved electroionic relay particularly adapted for use in dynamo electric machine regulation.

Other objects and advantages will appear from the specification and claims.

Embodiments and adaptations of the invention are diagrammatically illustrated in the accompanying drawings.

In the drawings—

Figure 1:
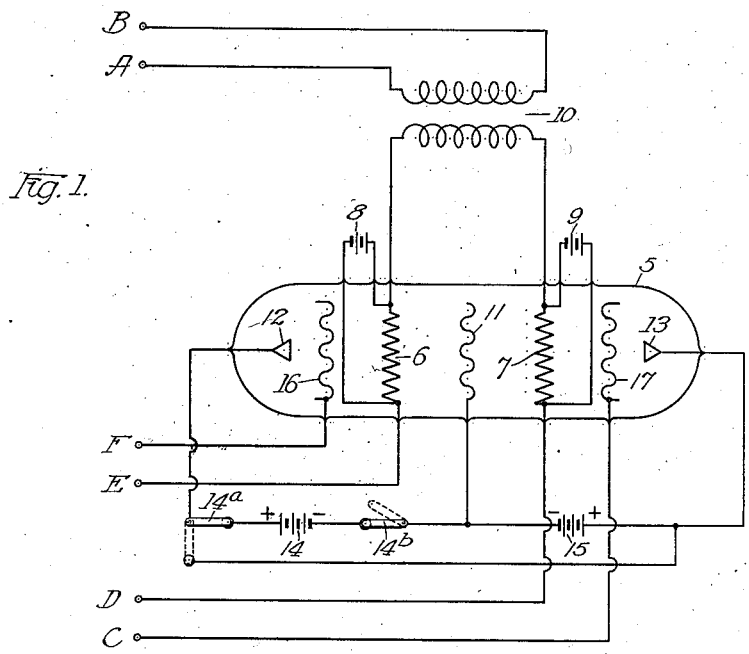
Fig. 1 shows one form of relay for obtaining the higher relay ratio in the amplification of alternating current.

Fig. 1 will first be described.

The relay comprises a vessel or tube 5 which may be evacuated to the desired degree or filled with a gas, as for example, mercury vapor or argon. Within vessel 5 are two main electrodes 6 and 7. Electrodes 6 and 7 may be in the form of filaments heated by current from batteries 8 and 9, respectively. These filaments are connected to the secondary winding of a transformer 10. The primary winding of transformer 10 is connected to a pair of terminals A and B. Terminals A and B are for connection to the apparatus or circuit to be regulated or controlled, as will be hereinafter described.

Alternating current is impressed upon the primary winding of transformer 10 from the circuit or apparatus to be controlled, inducing an alternating current in the secondary circuit thereof including filaments 6 and 7. These filaments are thus alternately subjected to alternating potential and at any instant the potential of one will be positive or negative while the potential of the other will be reversed or zero. Consequently filaments 6 and 7 will act alternately as anodes and cathodes and will pass current therebetween first in one direction and then in the reverse direction. They thus provide for passage of both half waves of each cycle of the alternating current.

Positioned between filaments 6 and 7 to control the discharge thereebtween is an auxiliary electrode 11, which may take the form of a grid. Grid 11 is connected through batteries 14 and 15 respectively to two auxiliary anodes 12 and 13, located near the opposite ends of vessel 5. Thus with respect to the grid 11, the auxiliary anodes 12 and 13 are connected in parallel. The grid 11 is connected with the negative poles of batteries 14 and 15. When it is desired to employ but a single battery, the switches 14ª and 14ᵇ may be moved to their dotted line positions thereby eliminating battery 14 and connecting anode 12 to the positive pole of battery 15. Between filament 6 and anode 12 and between filament 7 and anode 13, and controlling the respective discharges therebetween, are auxiliary electrodes 16 and 17. Electrodes 16 and 17 may be in the form of grids.

Grid 17 and filament 7 are respectively connected to terminals C and D and grid 16 and filament 6 are respectively connected to terminals E and F. The pairs of terminals C and D, and E and F are for connection to control circuits, or, as they may be termed, sensitive circuits of a complete system, each circuit controlling the discharge during one-half wave of each cycle of the discharge between filaments 6 and 7.

The main discharges in either direction over the main discharge path between filaments 6 and 7 are under the immediate control of and are sharply influenced by the potential of grid 11, as will more fully hereinafter appear. The potential of grid 11 is alternately controlled by the auxiliary discharges between cathode 6 and anode 12 and the auxiliary discharges between cathode 7 and anode 13. These auxiliary discharges are in turn controlled by the potentials of the grids 16 and 17 respectively. The potentials on grids 16 and 17 are controlled by the respective auxiliary discharges between them and filaments 6 and 7 which in turn are under the influence of the sensitive circuits connected to terminals E and F, and C and D, respectively.

Considering the direction of current flow in the secondary of the transformer 10 at a given instant, the filament 6 acts as cathode and filament 7 as anode. The cathode 6 emits electrons which pass to the anodes 7 and 12. These electrons are more crowded around the cathode forming space charges which influence the flow of electrons. The flow of the electrons, and consequently the discharges between the cathode and the anodes, may be controlled by the potentials of grids 11 and 16 which control these space charges. Thus grid 16 may directly control the discharge between cathode 6 and anode 12 and grid 11 may directly control the discharge between cathode 6 and filament 7 (now acting as anode). Since the charge effect of grid 11 is influenced by the discharge between cathode 6 and anode 12, the main discharge may be controlled by the effect of grid 16 which is under the influence of the sensitive circuit connected to terminals E and F. Consequently the circuit to be controlled which is connected to terminals A and B is under the influence of the sensitive circuit connected to terminals E and F.

Since electrons pass from cathode 6 to anode 12 the discharge can be controlled by either positive or negative potentials on grid 16. However, since in the relay as constructed there can be no flow of electrons from anode 12 to cathode 6 the main discharge between cathode 6 and anode 7 can be controlled only by negative potentials on grid 11.

Positive potentials on grid 16 tend to decrease the space charge about cathode 6 particularly in the direction of said grid, and thus increase the discharge between cathode 6 and anode 12. On the other hand, negative potentials on grid 16 tend to increase the space charge about cathode 6, particularly in the direction of said grid, and consequently decrease the discharge between cathode 6 and anode 12. The discharge between cathode 6 and anode 12 produces a corresponding current from anode 12 to grid 11 which tends to produce and maintain a charge on grid 11. This charge determines the space charge or crowding tendency of the electrons between grid 11 and cathode 6 and therefore controls the main discharge from cathode 6 to anode 7. My experiments have shown that even with a very small gas pressure there is not only a charging current to the grid 11 but a continuous stream of electrons from the cathode 6 to the anode 12, whereby this stream may be controlled by the charge of grid 16.

For the other half cycle of alternating current traversing the secondary of the transformer 10, the filament 7 acts as cathode and filament 6 as anode. The cathode 7, anode 13 and grids 17 and 11 now cooperate to influence the main discharge from the cathode 7 to anode 6.

As previously explained, there can be no discharge from anode 12 to filament 6. Likewise there can be no discharge from the anode 13 to the filament 7. Consequently when the filament 6 is serving as a cathode and filament 7 as an anode there is no interference due to the auxiliary discharge path between filament 7 and anode 13. Similarly when filament 7 is serving as a cathode and filament 6 as an anode, there is no interference due to the auxiliary discharge path between filament 6 and anode 12. This has been confirmed by experiment.

Thus for one half wave of the alternating current changes in the potential impressed upon grid 16 through the sensitive circuit connected to terminals E and F instantaneously and sharply influence the charges impressed upon grid 11 which in turn instantaneously and sharply influences the main discharge in one direction between filaments 6 and 7. The relay effect upon the main discharge is of the order of the product of the effects of the two grid systems upon the auxiliary and main discharges, or of the order of the product of the relay ratios of the discharges between electrodes 7 and 12 and filament 6. Thus, for example, if one volt change of potential on grid 16 is equivalent to ten volts change of potential on grid 11 and one volt change in potential on grid 11 is equivalent to ten volts change between filaments 6 and 7 a change of one volt in the sensitive circuit connected to terminals E and F will be equivalent to a variation of approximately one hundred volts in the control circuit connected to terminals A and B.

In a similar way for the other half wave of an alternating current the main discharge between filaments 6 and 7 is under the influence of grids 11 and 17. And, for example, a change of one volt in the sensitive circuit connected to terminals C and D may be equivalent to a variation of one hundred volts in the control circuit connected to terminals A and B. The relay ratios of the various discharges depend upon the construction, composition and arrangement of the electrodes and the vessel and also the degree of evacuation and the vessel, so that the ultimate relay ratio of the devices or the intensified self-magnifying thereof, may be varied as desired.

Figure 2:
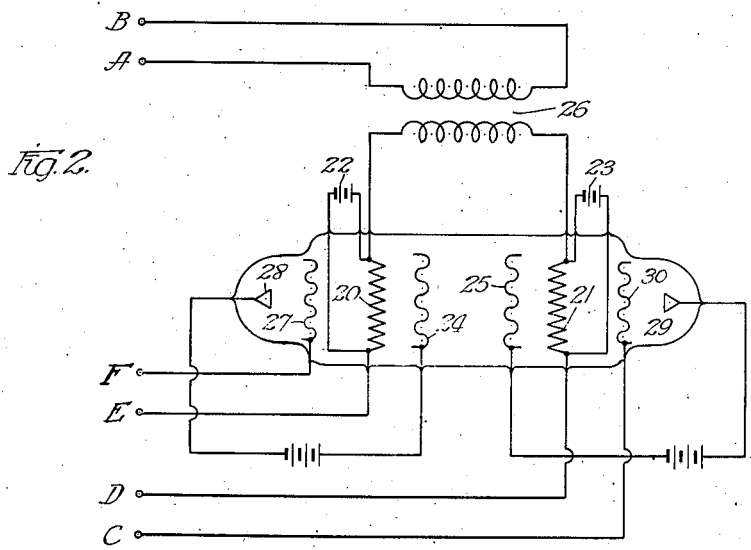
Fig. 2 shows a modified form of relay.

Fig. 2 shows a modified form of relay especially adapted for use in obtaining higher relay ratios. This relay has two main electrodes 20 and 21, heated by current from suitable batteries 22 and 23 and which act alternately as anodes and cathodes as previously described. In this relay, however, the discharge in each direction is immediately controlled by a separate auxiliary electrode 24 or 25. Electrodes 24 and 25 may be in the form of grids.

Both half waves of current in a control circuit connected to terminals A and B are controlled by the discharges between main electrodes 20 and 21 through a transformer 26.

One half wave is under the influence of a sensitive circuit connected to terminals E and F through the action of a grid 27. Grid 27 controls the discharge between electrode 20 and an electrode 28 which controls the potential on grid 24. Similarly for the other half wave the potential on grid 25 and consequently the main discharge is controlled by the auxiliary discharge between cathode 21 and an electrode 29, which in turn is controlled by an auxiliary discharge between cathode 21 and a grid 30. This last discharge is under the influence of the potential on grid 30 which is dependent upon the condition of a sensitive circuit connected to terminals C and D.

Figure 3:
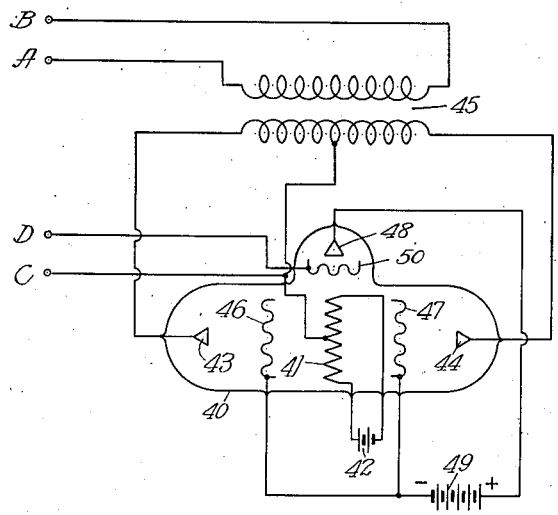
Fig. 3 shows another modified form of relay.

Fig. 3 shows a relay of simplified construction. An evacuated or gas filled vessel 40 is provided with a main cathode 41 heated from a suitable source of current 42. Associated with cathode 41 and located on opposite sides thereof are a pair of main anodes 43 and 44 which cooperate with the cathode to pass the respective half waves of alternating current through the relay.

Electrodes 43 and 44 are connected to the opposite ends of the secondary winding of a transformer 45, the middle point of which is connected to the middle point of the cathode 41. The primary winding of the transformer 45 is connected with the terminals A and B which are for connection to the circuit or apparatus to be controlled as before.

Between anodes 43 and 44 and cathode 41 are located respectively auxiliary electrodes 46 and 47, which may take the form of grids. These grids control directly the main discharges and are themselves influenced by the discharges through the auxiliary electrode 48. Electrode or anode 48 is located in a branch of vessel 40 and is connected in parallel to grids 46 and 47 through a battery 49. The negative pole of battery 49 is connected to the grids. Between anode 48 and cathode 41 is an auxiliary electrode 50 which may also take the form of a grid. A pair of terminals C and D for connection to the controlling or sensitive circuit are connected to cathode 41 and grid 50, respectively.

Both half waves of alternating current in a controlled circuit connected to terminals A and B are controlled by the discharges between the cathode 41 and the anodes 43 and 44. Both half waves are under the influence of a sensitive circuit connected to terminals C and D through the action of the grid 50. This grid 50 controls the discharge between the cathode 41 and the anode 48, which controls the potential of grids 46 and 47.

Figure 4:
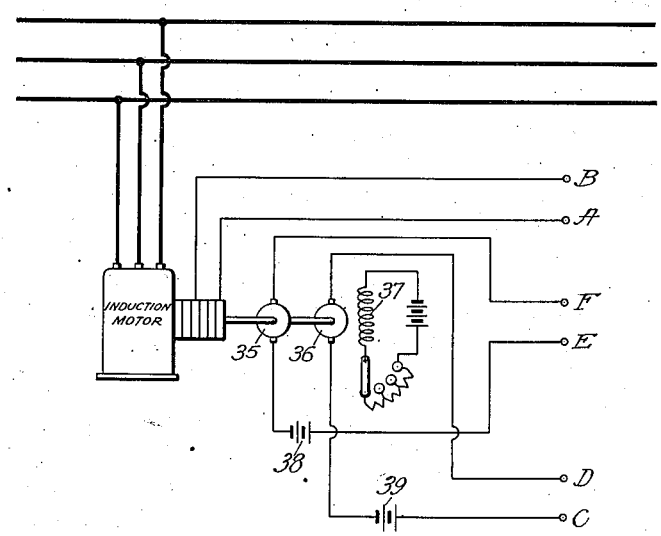
Fig. 4 shows one example of a regulating and control system with which the relays may be associated.

Fig. 4 shows an alternating current motor control system with which either of the foregoing relays may be combined to form a complete controlling and regulating system. This figure shows an induction motor whose load current is regulated for variations in load, impressed voltage, etc. by controlling its induced or secondary current. This system is given merely for the purpose of illustrating one of the many uses for which the relay is adapted.

The motor derives its current from a three-phase line and is controlled by regulating the current induced in a secondary winding connected to terminals A and B. Terminals A and B are adapted to be connected to the corresponding terminals of either of the previously described relays.

Connected to the motor shaft to be driven thereby, and thus to simulate the operation thereof, is a small direct current generator or tachometer machine having two generating sets of armatures, commutators and brushes 35 and 36 and an adjustable separately excited field 37. The brushes of generating set 35 are connected respectively to terminals E and F through a battery 38. The brushes of the other generating set 36 are connected respectively to terminals C and D through a battery 39. Terminals C and D, and E and F are adapted to be connected to the like designated terminals of the relays shown in Figs. 1 and 2. An alternating instead of a direct current tachometer machine may be employed if desired. When an alternating current tachometer machine is employed, the brushes of its generating armatures are connected with terminals C and D, and E and F through transformer windings.

When the relay of Fig. 3 is employed to regulate the motor of Fig. 4, the generating armature of the tachometer machine connected with terminals E and F need not be used.

The tachometer machine, being driven as it is directly by the shaft of the machine to be regulated and having no motion of its own, injects into the system no mechanical inertia affecting the regulation and control.

The currents necessary to create the desired grid potentials are extremely small, in fact if negative grid potentials are employed, the flow of current is negligible so far as its effect upon the induction of the tachometer machine winding is concerned, even though the vessel be not absolutely evacuated. Consequently the induction of the tachometer machine winding is so very small that it has practically no effect upon the regulation.

Variations in motor speed brought about by changes in load, line voltage, etc., substantially coincidently produce changes in the tachometer voltage which immediately vary the charges of the grids connected to the sensitive circuits. These variations in the charges on the grids connected to the sensitive circuits substantially coincidently produce changes in the main discharge according to the half wave of the alternating current induced in the transformer by the motor secondary. The variations in the main discharge vary the current induced in the transformer secondary which instantaneously reacts upon the transformer primary to vary the effective or apparent resistance of the secondary circuit of the motor, whereby the voltage thereof is varied.

The operating conditions of the motor may be controlled by varying the excitation of the tachometer.

The relay shown in Fig. 3 may be employed to control an alternating current obtained from a source of direct current, the relay also serving as a converter to produce such alternating current. In this connection, reference is made to my co-pending application Serial No. 248,855, filed August 8, 1918. Fig. 6 of my co-pending application shows an electroionic relay employed as a converter. The self-intensifying relay of Fig. 3 may be substituted for the relay of Fig. 6 in the co-pending application. By varying the secondary voltage of the motor in this manner, in accordance and substantially coincidently with variations in the motor operating conditions, the proper corrective effect is coincidently applied to the motor.

What is claimed is:

1. An electroionic valve comprising in a single vessel a pair of main electrodes adapted to be included in a circuit traversed by alternating current and to act alternately as cathode and anode with respect to each other, and means providing paths for a plurality of auxiliary discharges, said means providing for influence of one of said auxiliary discharges by another of said auxiliary discharges and for control of the discharge between said main electrodes by the former auxiliary discharge.

2. An electroionic relay comprising in a single vessel a pair of main electrodes adapted to be included in a circuit traversed by alternating current and to act alternately as cathode and anode with respect to each other whereby discharges therebetween pass alternately in opposite directions, means providing paths for individual auxiliary discharges to control the main discharge when one and when the other respectively of the main electrodes is acting as anode, and means providing a path for another auxiliary discharge associated with each of the first mentioned auxiliary discharges for controlling the effect thereof upon the main discharge.

3. An electroionic relay comprising within a single vessel a plurality of main electrodes between which discharges pass alternately in opposite directions, means comprising an auxiliary electrode to control the discharges between the main electrodes, and additional pairs of auxiliary electrodes, one pair for controlling the effect of the first auxiliary electrode upon successive individual half waves of the main discharge and the other pair of auxiliary electrodes being adapted to control the effect of the first pair of auxiliary electrodes upon said first mentioned auxiliary electrode.

4. An electroionic relay comprising in a single vessel a plurality of main electrodes for electroionically passing therebetween in opposite directions successive half waves of a single phase of alternating current, and means providing pairs of paths for auxiliary electroionic discharges associated with each main electrode, said means being arranged whereby one pair of auxiliary electroionic discharges controls one half wave discharge between the main electrodes and whereby the other pair of auxiliary discharges controls the succeeding half wave discharge between the main electrodes, said means being also arranged to provide for cumulative action of certain of said auxiliary discharges upon the same half wave of the main discharge.

5. An electroionic relay comprising in a single vessel, means providing a main discharge path for passage thereover of successive half waves of a cycle of alternating current and means providing paths for a plurality of cumulatively acting auxiliary discharges for control and cumulative amplification of the individual half waves of the main discharge.

6. An electroionic relay for controlling the current in an alternating current circuit in accordance with variations in electrical condition of a sensitive circuit, comprising in a single vessel, means providing a main discharge path, terminals for said means to connect the same to said controlled circuit, means providing paths for a plurality of cumulatively acting auxiliary discharges to act upon each successive half wave of the main discharge, said latter means having terminals for connecting the same to such sensitive circuit and certain of the auxiliary discharges provided by said latter means being adapted to act upon successive half waves of said main discharge.

In witness whereof, I have hereunto subscribed my name.

Dr. FRIEDRICH WILHELM MEYER.